United States Patent
Schwindt et al.

(10) Patent No.: US 11,260,876 B2
(45) Date of Patent: Mar. 1, 2022

(54) INTER-VEHICLE SENSOR VALIDATION USING SENSO-FUSION NETWORK

(71) Applicant: Robert Bosch GmbH, Stuttgart (DE)

(72) Inventors: Oliver Schwindt, Sunnyvale, CA (US);
Andreas Heyl, Sunnyvale, CA (US);
Thomas Gussner, Ludwigsburg (DE);
Theresa Kienle, Neugereut (DE);
Joachim Mueller, Boeblingen (DE);
Stephan Reuter, Thalfingen (DE)

(73) Assignee: Robert Bosch GmbH, Stuttgart (DE)

( * ) Notice: Subject to any disclaimer, the term of this patent is extended or adjusted under 35 U.S.C. 154(b) by 69 days.

(21) Appl. No.: 16/180,183

(22) Filed: Nov. 5, 2018

(65) Prior Publication Data
US 2020/0139981 A1  May 7, 2020

(51) Int. Cl.
*B60W 50/02* (2012.01)
*G05D 1/00* (2006.01)
*G05D 1/02* (2020.01)

(52) U.S. Cl.
CPC ....... *B60W 50/0205* (2013.01); *G05D 1/0088* (2013.01); *G05D 1/0212* (2013.01); *G05D 1/0238* (2013.01); *B60W 2050/0215* (2013.01); *B60W 2556/65* (2020.02); *G05D 2201/0213* (2013.01)

(58) Field of Classification Search
CPC .. G05D 1/0287; G05D 1/0088; G05D 1/0212; G05D 1/0238; G05D 2201/0213; G01S 2013/9316; G06K 2009/6295; G06K 9/6288; B60W 50/0205; B60W 2050/0215

See application file for complete search history.

(56) References Cited

U.S. PATENT DOCUMENTS

| | | | |
|---|---|---|---|
| 9,612,213 B2* | 4/2017 | Meijer Drees | G01N 23/09 |
| 10,558,224 B1* | 2/2020 | Lin | H04W 4/40 |
| 2013/0282200 A1* | 10/2013 | Anderson | G05D 1/00 701/1 |
| 2015/0254986 A1* | 9/2015 | Fairfield | G05D 1/0088 707/687 |
| 2017/0124781 A1* | 5/2017 | Douillard | G08G 1/202 |
| 2017/0232974 A1* | 8/2017 | Nishida | B60W 50/082 701/24 |
| 2018/0190046 A1* | 7/2018 | Levinson | G07C 5/0808 |
| 2019/0196806 A1* | 6/2019 | Ewert | G06F 8/654 |
| 2019/0243371 A1* | 8/2019 | Nister | G05D 1/0231 |
| 2019/0250632 A1* | 8/2019 | Agarwal | G05D 1/0088 |

FOREIGN PATENT DOCUMENTS

DE   102016207836 A1 * 11/2017 ........... B60R 16/023

* cited by examiner

*Primary Examiner* — Kenneth J Malkowski
(74) *Attorney, Agent, or Firm* — David Kovacek; Maginot, Moore & Beck LLP

(57) ABSTRACT

A system and method of sensor validation utilizing a sensor-fusion network. The sensor-fusion network may comprise a number of sensors associated with one or more vehicles having autonomous or partially autonomous driving functions.

13 Claims, 4 Drawing Sheets

INTER-VEHICLE SENSOR VALIDATION USING SENSO-FUSION NETWORK

TECHNICAL FIELD

This disclosure relates to sensor systems that may support vehicles having autonomous or partially autonomous self-driving functions.

BACKGROUND

Vehicles having self-driving or driver-assistance functions rely upon sensor information to determine the driving conditions. Sensors may be utilized to provide data indicating environmental conditions, traffic conditions, or operational conditions of the vehicle. This sensor-generated data allows safe and effective operation of the self-driving or driver-assistance functions of the vehicle.

Sensor functionality may change over the course of normal operation. Sensor operation may be affected by environmental conditions, gradual loss of calibration, degradation of components over time, electrical or electronic (E/E) faults, system failures, or unexpected events such as collisions. Changes in sensor functionality may create a less reliable operation of the vehicle's functions. Therefore, it a system and method of validating sensor operation during normal use may advantageously improve reliability and safety of vehicle operation.

SUMMARY

One aspect of this disclosure is directed to a vehicle sensor validation system comprising a coordinating processor in data communication with a number of vehicles, a sensor-fusion network comprising a plurality of sensors, wherein the coordinating processor is in data communication with a least some of the plurality of sensors. The coordinating processor may be operable to validate the data of one of the plurality of sensors using the data generated by at least some of the other sensors in the sensor-fusion network. The first sensor may be associated with a first vehicle and at least one other sensor of the sensor-fusion network may be associated with a second vehicle.

Another aspect of this disclosure is directed to a method of object validation for a sensor-fusion network associated with at least one vehicle. A first sensor may generate first object data indicating the presence of an object detected by the first sensor, and at least one other sensor within the sensor-fusion network may generate additional data indicating the presence of an object. The generated data may be utilized to calculate coordinated-validation data indicating an object status. In some embodiments, different sensors may be associated with different vehicles.

The above aspects of this disclosure and other aspects will be explained in greater detail below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
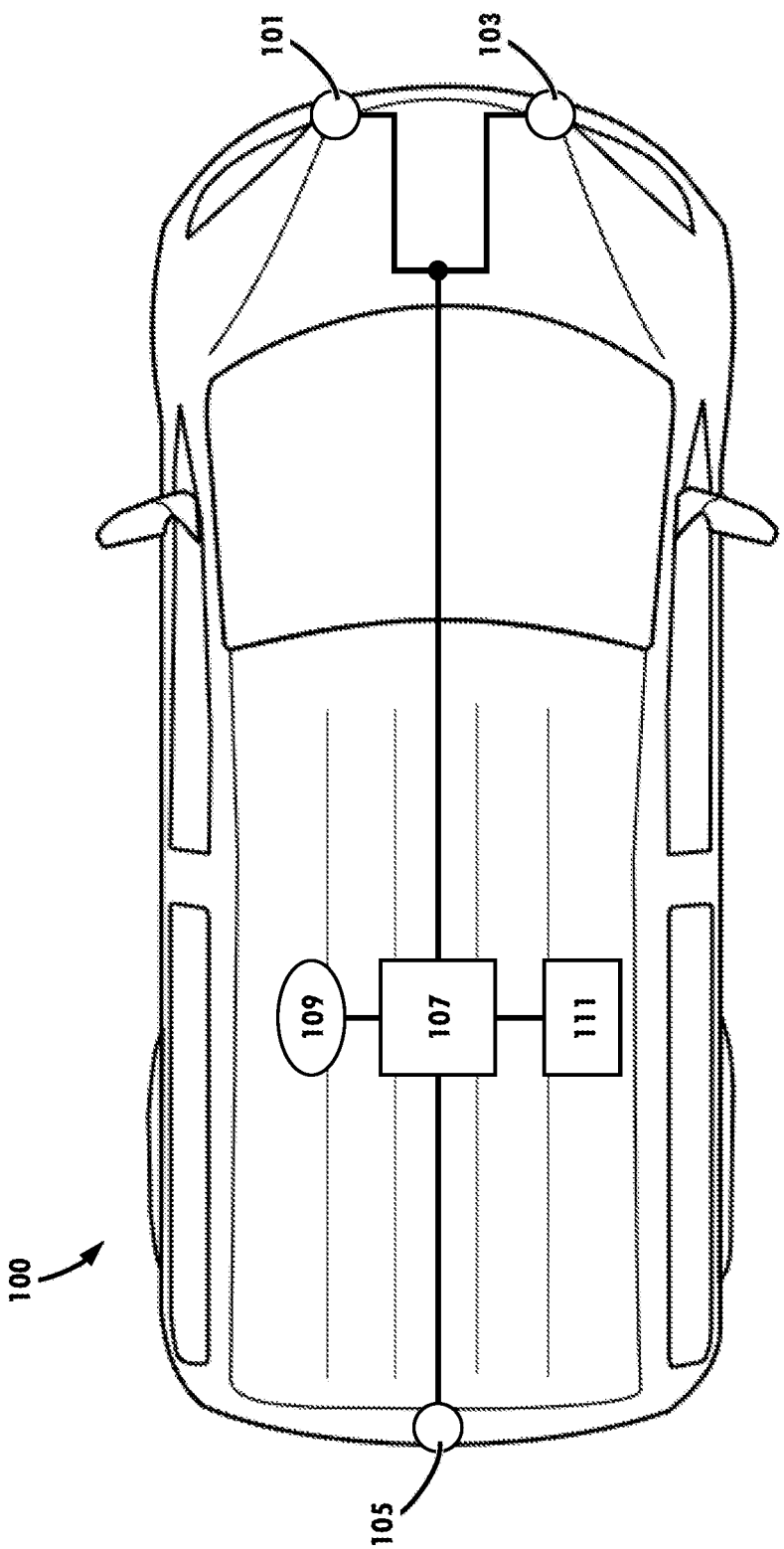
FIG. 1 is a diagrammatic illustration of a vehicle having sensors associated with a sensor-fusion network.

FIG. 1 depicts a diagrammatic illustration of a vehicle 100 having sensors suitable for inclusion in a sensor-fusion network. In the depicted embodiment, vehicle 100 comprises a first forward sensor 101, a second forward sensor 103, and a rear sensor 105. Other embodiments may comprise other configurations without deviating from the teachings disclosed herein. In some embodiments, vehicle 100 may comprise a different number of forward sensors, a different number of rear sensors, sensors positioned along either side of the vehicle, undercarriage sensors, roof sensors, or any other sensor known to one of ordinary skill in the art without deviating from the teachings disclosed herein. In the depicted embodiment, each of the sensors depicted may comprise sensors suitable for object detection, but other embodiments may comprise other forms of sensors without deviating from the teachings disclosed herein. Sensors may comprise proximity sensors, motion sensors, radar sensors, lidar sensors, infrared sensors, ultra-sonic sensors, echolocation sensors, or any other sensor known to one of ordinary skill in the art without deviating from the teachings disclosed herein. In some embodiments, one or more of first forward sensor 101, second forward sensor 103, and rear sensor 105 may comprise sensors of different types or specification. In some embodiments, one or more sensors may be configured to generate sensor data and confidence data indicating a relative confidence of the accuracy of the associated sensor data.

Operation of the sensors and other functions of the vehicle may be coordinated by a vehicle processor 107. Vehicle processor 107 may be operable to control the functions of each of the sensors of vehicle 100. Vehicle processor 107 may be operable to control other functions of vehicle 100. Vehicle processor 107 may be operable to control autonomous driving functions, partially autonomous driving functions, self-driving functions, or driver-assistance functions. Vehicle processor 107 may be operable to perform calculations relevant to operation of functions of vehicle 100, including calculations involving data generated by one or more of the sensors associated with vehicle 100.

Vehicle 100 may also comprise a location sensor 109 in data communication with vehicle processor 107. Location sensor 109 may be operable to generate location data indicating the location of vehicle 100. Location sensor 109 may be operable to detect the position of vehicle 100 within the context of a global positioning system (GPS), a global navigation satellite system (GNSS), a proprietary navigation system, or any other positioning system known to one of ordinary skill in the art without deviating from the teachings disclosed herein. In some embodiments, the dimensions of vehicle 100 may be known to vehicle processor 107, enabling calculations pertaining to the exact position of particular portions of vehicle 100 with respect to the location data generated by location sensor 109.

Vehicle 100 may also comprise a transceiver 111 in data communication with vehicle processor 107. Transceiver 111 may provide data communication between vehicle processor 107 and one or more processors external to vehicle 100. In the depicted embodiment, transceiver 111 comprises a wireless transceiver unit. Some embodiments may comprise a separate transmitter and receiver without deviating from the teachings disclosed herein. Transceiver 111 may be operable to utilize one or more wireless transmission formats, such as wi-fi, Global System for Mobile communications (GSM), a zigby wireless protocol, or any other wireless communication format known to one of ordinary skill in the art without deviating from the teachings disclosed herein. Transceiver 111 may enable vehicle processor 107 to interact with other processors within a sensor-fusion network.

In the depicted embodiment, vehicle 100 is a passenger vehicle, but other embodiments may comprise other configurations without deviating from the teachings disclosed herein. In some embodiments, vehicle 100 may comprise a sedan, truck, van, motorcycle, bus, military vehicle, watercraft, personal aircraft, commercial aircraft, or any other vehicle utilizing sensors recognized by one of ordinary skill in the art without deviating from the teachings disclosed herein.

Figure 2:
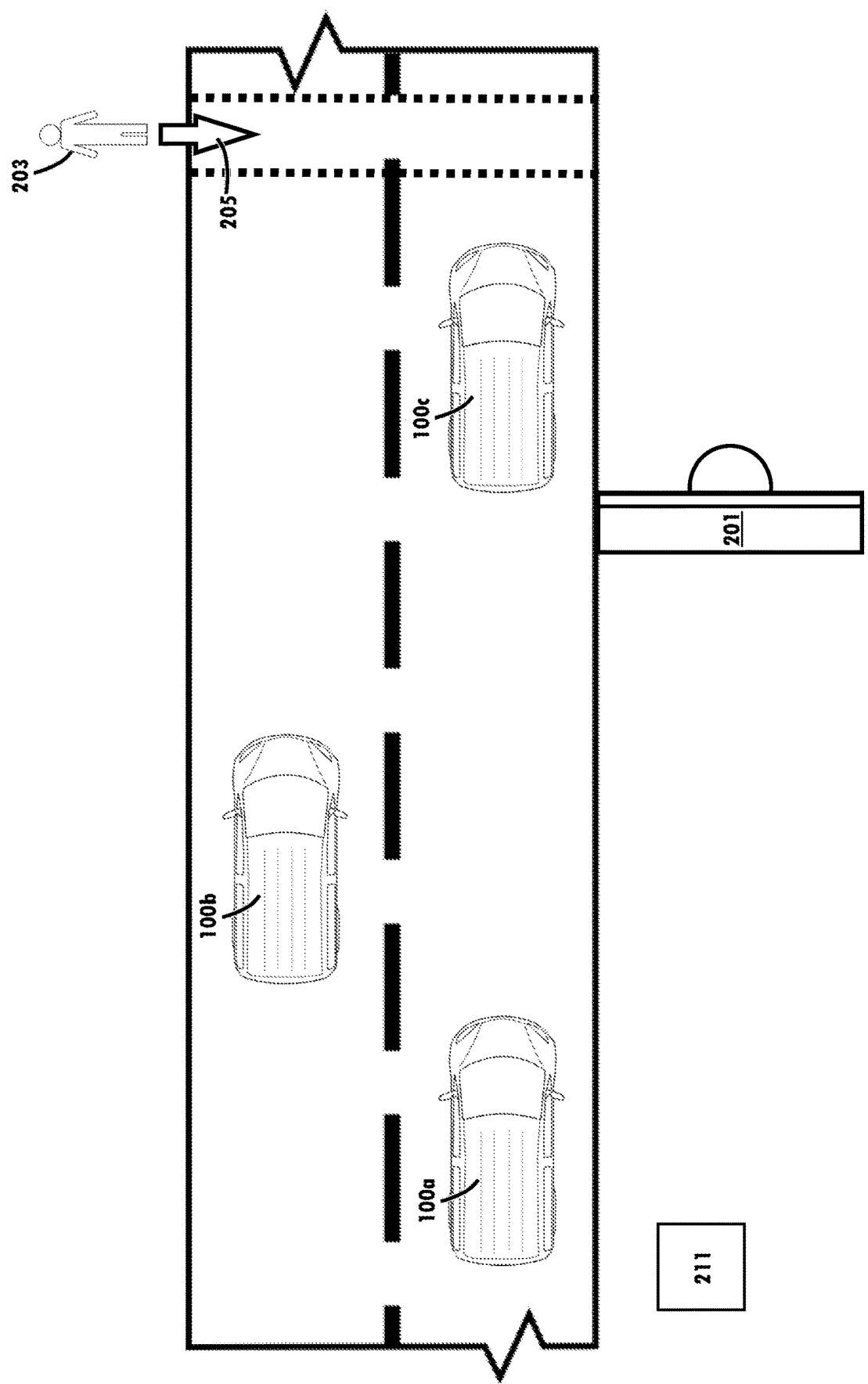
FIG. 2 is a diagrammatic illustration of a sensor-fusion network operable to validate sensor data pertaining to static and moving objects in the environment.

FIG. 2 is a diagrammatic illustration of a sensor-fusion network operable to validate the findings of at least one sensor within the network. In the depicted embodiment, the sensors are associated with a number of vehicles 100 (see FIG. 1), but other embodiments may comprise sensors not associated with a particular vehicle without deviating from the teachings disclosed herein. In the depicted embodiment, each of vehicles 100 comprises a passenger vehicle having the configuration depicted in FIG. 1, but other embodiments may comprise different types of vehicles, including dissimilar vehicle types or other configurations of vehicle 100 discussed above with respect to FIG. 1, without deviating from the teachings disclosed herein.

In the depicted embodiment, vehicle 100a may serve as a subject vehicle having a sensor suitable for validation. A sensor may be selected for validation in response to expected circumstances or unexpected circumstances. Expected circumstances may comprise operating conditions in which a vehicle 100 is subjected to normal functional conditions. Examples of expected circumstances may comprise a predetermined duration of operation, a predetermined distance of travel, routine maintenance, sensor data confidence below a predetermined threshold value, or any other expected conditions recognized by one of ordinary skill in the art without deviating from the teachings disclosed herein. Unexpected circumstances may comprise operating conditions in which a vehicle 100 is subjected to abnormal functional conditions. Examples of unexpected circumstances may comprise an E/E fault, a failure of one or more vehicle components, abnormal function of one or more vehicle components, repair or replacement of one or more vehicle components, operation in sub-optimal environmental conditions, vehicle collision, or any other unexpected condition recognized by one of ordinary skill in the art without deviating from the teachings disclosed herein. Examples of E/E faults may comprise bit flips, software errors, incorrect sensor scheduling, or communication failures between a vehicle component and another component of the vehicle or external to the vehicle. Examples of abnormal function may comprise insufficiency of systems according to a required operational specification, such as ISO/PAS 21488. Such abnormal functions may result from adverse environmental conditions, such as precipitation or fog. In some embodiments, a vehicle processor 107 may be operable to diagnose an exact reason for the circumstance warranting a validation without deviating from the teachings disclosed herein. In such embodiments, vehicle processor 107 may be operable to generate an indication of the diagnosis to a user.

Other scenarios may feature other vehicles as a subject vehicle without deviating from the teachings disclosed herein. In the depicted embodiment, each of the vehicles 100 may be selected as a subject vehicle in response to detection of an expected or unexpected circumstance.

In the depicted embodiment, sensors associated with each of vehicles 100 may be operable to detect a stationary object or a moving object. The objects detectable by the sensors may be dictated by the specification of the particular sensors of each vehicle. In the depicted embodiment, a stationary object may comprise a street sign 201, but other embodiments may comprise other stationary objects without deviating from the teachings disclosed herein. By way of example and not limitation, stationary objects may also comprise trees, parked vehicles, light posts, barricades, traffic cones, traffic islands, curbs, speed bumps, or any other stationary object known to one of ordinary skill in the art to be found within active traffic without deviating from the teachings disclosed herein.

In the depicted embodiment, a moving object may comprise a pedestrian 203, but other embodiments may comprise other moving objects without deviating from the teachings disclosed herein. By way of example and not limitation, moving objects may also comprise motor vehicles, bicycles, trolley cars, animals, errant children's toys, debris or detritus, or any other moving or potentially moving object known to one of ordinary skill in the art to be found within active traffic without deviating from the teachings disclosed herein. In the depicted embodiment, pedestrian 203 is moving along a trajectory 205. In the depicted embodiment, sensors of vehicles 100 may be operable to detect or predict motion of pedestrian 203 along trajectory 205.

In the depicted embodiment, the vehicle processors 107 (see FIG. 1) of each of vehicles 100 may be in data communication with a coordinating processor 211. Coordinating processor 211 may be operable to provide data communication between vehicles 100, including sharing of sensor data or confidence data between vehicles 100. Some embodiments may not comprise coordinating processor 211, and instead one or more of vehicle processors 107 may provide the functions of the coordinating processor.

In an example operation of the depicted embodiment, vehicle 100a may detect an expected circumstance warranting a validation of first forward sensor 101a. During operation, first forward sensor 101a may indicate the presence street sign 201 and pedestrian 203. Because the expected circumstance warrants a validation, first forward sensor 101a may be considered a subject sensor in a validation measurement. Additional attempts to detect the objects may be made by second forward sensor 103a, first forward sensor 101b, second forward sensors 103b, first forward sensor 101c, second forward sensor 103c, or rear sensor 105c for validation, each of the other sensors acting as a reference sensor during the validation measurement. Not all of the sensors of the sensor-fusion network may be utilized for a particular validation measurement. For example, first forward sensor 101c and second forward sensor 103c may not be in position to accurately detect street sign 201, and rear sensor 105c may not be in position to accurately detect pedestrian 203. Coordinating processor 211 may thus not utilize these sensors for data with respect to measurements that are known to be improperly positioned.

After the detection operation has been completed with the appropriate sensors, coordinating processor 211 may utilize an algorithm to generate coordinated-validation data indicating a detection result for each of the objects. The algorithm may take the form of a majority-voter algorithm. For example, in detecting street sign 201, coordinating processor may rely upon second forward sensor 103a, first forward sensor 101b, and second forward sensor 103b. If any two of the three sensors provides a positive detection result, coordinating processor 211 may generate coordinated-validation data indicating a positive detection.

In some embodiments, confidence data may be generated that is associated with each of the sensors that coordinating processor 211 utilizes during a validation measurement. Higher confidence values reported by a particular sensor may yield a higher weighting of that result in the algorithm when generating coordinated-validation data. For example, in a validation measurement to detect pedestrian 203, first forward sensor 101c may report a higher confidence of detection than second forward sensor 103c because of its relative position with respect to pedestrian 203. Thus, the coordinating processor 211 may give a higher weight to the data generated by first forward sensor 101c when applying the algorithm to generate coordinated-validation data.

In some embodiments, the specification of sensors may be different between sensors, such that some sensors are more accurate or resilient than others. For example, during validation of a detection of street sign 201, first forward sensor 101b may have a better specified accuracy than rear sensor 105c. Thus, the coordinating processor 211 may give a higher weight to the data generated by first forward sensor 101b when applying the algorithm to generate coordinated-validation data.

Though the depicted embodiment comprises three vehicles 100, each having two forward sensors and a rear sensor, other embodiments may be utilized that comprise an arbitrary number of compatible sensors other than the subject sensor. Coordinating processor 211 may be operable to determine the location and placement of sensors within the sensor-fusion network and selectively utilize only sensors that are within appropriate proximity to provide reference measurements for a validation. In embodiments with selective utilization of sensors within the sensor-fusion network, a majority-voter algorithm may be defined based upon a majority of selected sensors. Common examples of majority-voter algorithms simple majorities, such as 2-out-of-3 or 3-out-of-5 reference sensors. In some embodiments, other majority-voter algorithms may be used other than simple majorities, such as a 4-out-of-5 or 8-out-of-10 reference sensors. Other embodiments may utilize any majority-voter algorithm recognized by one of ordinary skill in the art without deviating from the teachings disclosed herein.

In some embodiments, sensors not affiliated with a vehicle may be available for use in the sensor validation. Such sensors may be disposed upon an object in the environment and operable as part of the sensor-fusion network. For example, in some embodiments, an environmental sensor may be placed upon street sign 201 and in data communication with coordinating processor 211. In such embodiments, coordinating processor 211 may give a higher weight to environmental sensors that are particularly useful in a validation measurement. By way of example and not limitation, a very high weight may be given to an environmental sensor disposed upon street sign 201 because the sensor itself serves as an indication to the sensor-fusion network that the street sign 201 is the object being validated. Other embodiments may comprise other environmental sensors without deviating from the teachings disclosed herein.

The operation of vehicle 100a may be adjusted or adapted in response to the results of a validation process. In the depicted embodiment, a completed validation process will yield coordinated-validation data to vehicle processor 107a indicating whether or not the measurements of first forward sensor 101a have been successfully validated. If the measurements of first forward sensor 101a are successfully validated, vehicle processor 107a may generate an indication to a user that the validation is successful. In response to some conditions warranting a validation (such as unexpected conditions), vehicle processor 107a may generate an indication to a user of the condition and may indicate an advisory warning for the user to seek service of the vehicle. If the measurements of first forward sensor 101a are not successfully validated, vehicle processor 107a may generate an indication that the validation was unsuccessful. In response to an unsuccessful validation, vehicle processor 107a may generate an advisory warning for the user to seek service of the vehicle. In response to some unsuccessful validations, vehicle processor 107a may transition the operations of vehicle 100a into a "safe state" with reduced reliance upon sensors that are not successfully validated. Some safe states may limit or avoid self-driving functions of vehicle 100a and may instead relinquish greater control to a driver of vehicle 100a until service is rendered. In some embodiments, vehicle processor 107a may operate vehicle 100a to a safe position on the road and stop operation of vehicle 100a. In some embodiments, vehicle processor 107a may continue to operate vehicle 100a relying upon validation measurements from other vehicles in the environment, and may adjust operation if vehicle 100a is in an environment without sufficient access to local members of the sensor-fusion network to safely navigate the environment.

Figure 3:
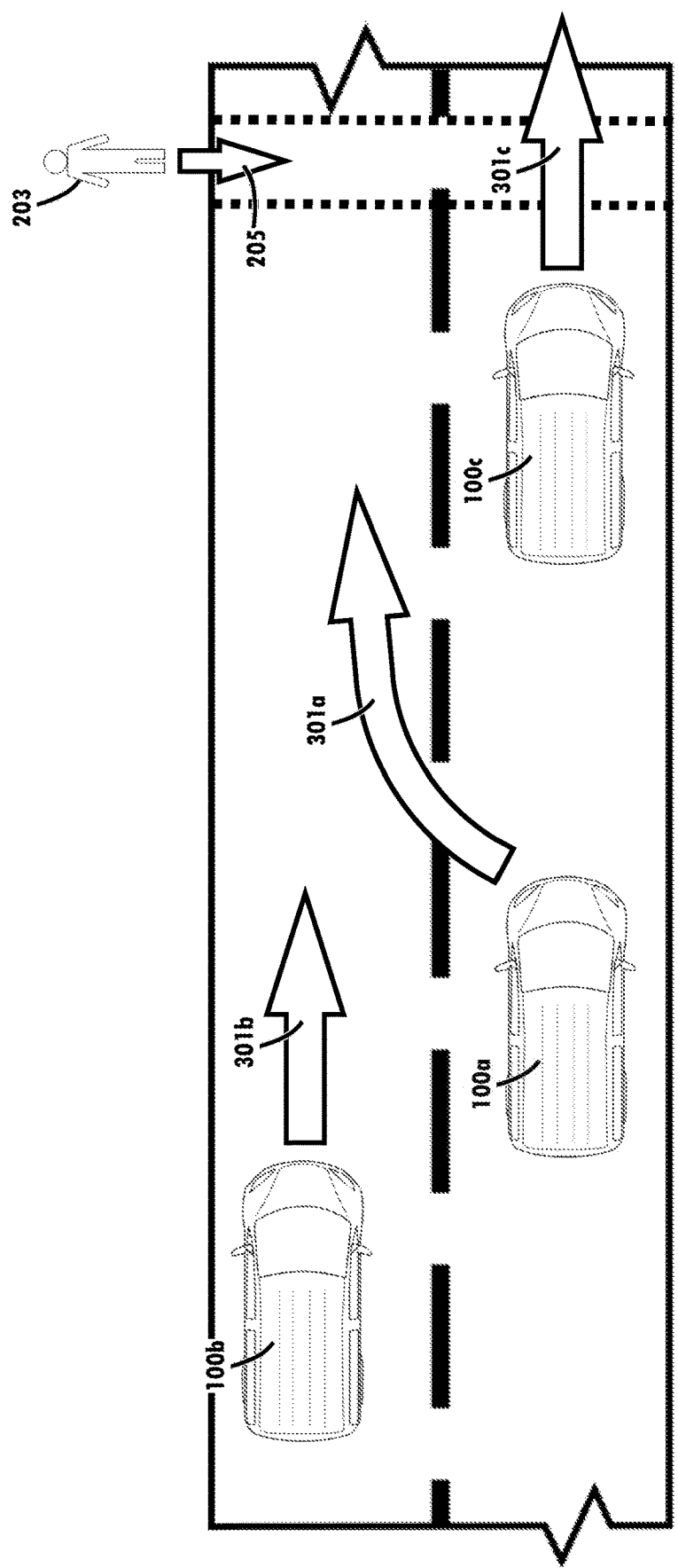
FIG. 3 is a diagrammatic illustration of a sensor-fusion network operable to predict clearances of vehicle trajectories.

Another function of a sensor-fusion network may be validation of a trajectory of a vehicle based upon the conditions of traffic and the environment with respect to the planned trajectory. FIG. 3 depicts another embodiment of a sensor-fusion network during a prediction of trajectories of moving objects. In the depicted embodiment, vehicles 100a, 100b, and 100c are planning to move in trajectories 301a, 301b, and 301c respectively. Before and during motion along their respective trajectories, each of vehicles processors 100 (see FIG. 1) may predict whether the trajectory will remain clear of objects during the motion.

In the depicted embodiment, processors for each of the vehicles 100 may utilize sensors to generate data used to predict clearance of travel trajectories during motion. Vehicles 100b and 100c may select a trajectory that continues along the current direction of travel, such as trajectory 301b and 301c respectively. Vehicle 100a may select a trajectory to change lanes and pass vehicle 100c, such as trajectory 301a. Other moving objects in the environment may provide complication to completion of motion along a particular trajectory. In the depicted embodiment, pedestrian 203 is traveling along trajectory 205 to cross the road within a cross-walk. Each of vehicles 100 may therefore detect pedestrian 203 and predict trajectory 205. If a detection result for a vehicle 100 is made under a circumstance warranting validation, the associated vehicle processor 107 (see FIG. 1) may initiate a validation. In the depicted embodiment, the vehicle processor 107 of the subject vehicle initiating validation may perform the functions of a coordinating processor, such as coordinating processor 211

(see FIG. 2). Other embodiments may comprise a dedicated coordinating processor, such as coordinating processor 211, without deviating from the teachings disclosed herein.

In the depicted embodiment, each of vehicles 100 comprise part of the sensor-fusion network, and may be operable to share their current position and trajectory with other vehicles within the sensor-fusion network. Such shared information may be utilized to increase accuracy of trajectory predictions. For example in the depicted embodiment, if trajectory 301a and trajectory 301b are predicted to result in a collision between vehicles 100a and 100b, one or both of vehicles 100a and 100b may instead alter maneuvers to avoid a collision. Maneuvers may be altered in terms of velocity, direction, or timing of the trajectory. For example, vehicle 100b may slow down while maneuvering along trajectory 301b in order to permit vehicle 100a to safely change lanes along trajectory 301a. In other scenarios, the trajectories may be changed to another trajectory in order to avoid collision.

Similarly, vehicle processor 107a may predict the position of pedestrian 203 upon completion of a maneuver along trajectory 301a. If the prediction indicates a collision of vehicle 100a with pedestrian 203, trajectory 301a may be altered to avoid a collision. For example, vehicle 100a may delay the lane change maneuver until after it has safely passed pedestrian 203.

In some embodiments, trajectory predictions and validations may be calculated based upon other objects in the environment without deviating from the teachings within. Trajectory predictions and validations may incorporate stationary objects or moving objects without deviating from the teachings disclosed herein.

Figure 4:
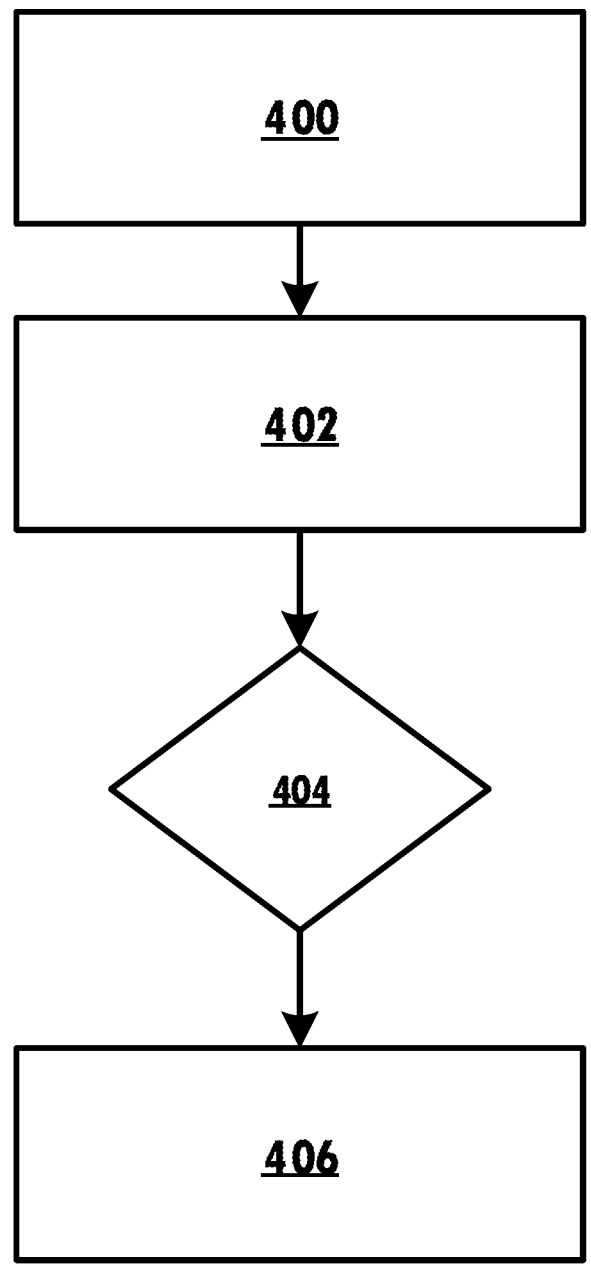
FIG. 4 is a flowchart illustrating a method of sensor validation using a sensor-fusion network.

FIG. 4 depicts a flowchart providing a method of object validation. This method may be utilized after determination of a condition warranting validation of one or more sensors within a sensor-fusion network system. In step 400, a number of sensors other than the subject sensor are defined as reference sensors for the validation operation. These reference sensors may be suitable to generate object data. Object data may comprise object status data indicating whether an object has been detected, and may further include confidence data associated with the object status data, indicating the level of confidence for each associated measurement. Object status data may be interpreted to indicate the existence of an object, and confidence data may be interpreted to indicate the probability of the positive detection of existence being correct. Other object status data may comprise dynamic attributes of a detected object, such as velocity, heading, acceleration, or relative position without deviating from the teachings disclosed herein. Other object status data may comprise identifying attributes of a detected object, such as measurable dimensions, color, object classifications, relation to the sensor-fusion network, or any other identifying attribute without deviating from the teachings disclosed herein.

At step 402, each of the reference sensors is used to perform a validation measurement and generates object data. After each of the reference sensor generates object data, the object data is collected at step 404, and used by an algorithm to calculate coordinated-validation data indicating a coordinated detection result for an object. The algorithm of step 404 may utilize weighting of object data based upon the specification, proximity, position, or other sensor characteristics used to generate each sensor's respective object data. After the algorithm has been completed, the coordinated-validation data may be generated in step 406, indicating a validation result for object detection of the subject sensor.

In the depicted embodiment, the algorithm of step 404 may comprise a majority-voter algorithm, but other embodiments may comprise other algorithms without deviating from the teachings disclosed herein.

In the depicted embodiment, the method of FIG. 4 may be executed by a processor in response to computer-readable instructions stored upon a computer-readable medium. Computer-executable instructions may include instructions and data which cause a general purpose computer, special purpose computer, or special purpose processing device to perform a certain function or group of functions. Computer-executable instructions may also include program modules that are executed by computers in stand-alone or network environments. Program modules may include routines, programs, objects, components, or data structures that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps. A computer-readable medium may be embodied as a non-transitory computer-readable storage medium or a machine-readable medium for carrying or having computer-executable instructions or data structures stored thereon. Such non-transitory computer-readable storage media or machine-readable medium may be any available media embodied in a non-transitory hardware or physical form that can be accessed by a general purpose or special purpose processor. By way of example, and not limitation, such non-transitory computer-readable storage media or machine-readable medium may comprise random-access memory (RAM), read-only memory (ROM), electrically erasable programmable read-only memory (EEPROM), optical disc storage, magnetic disk storage, linear magnetic data storage, magnetic storage devices, flash memory, or any other medium which can be used to carry or store desired program code means in the form of computer-executable instructions or data structures. Combinations of the above should also be included within the scope of the non-transitory computer-readable storage media or machine-readable medium.

While exemplary embodiments are described above, it is not intended that these embodiments describe all possible forms of the disclosed apparatus and method. Rather, the words used in the specification are words of description rather than limitation, and it is understood that various changes may be made without departing from the spirit and scope of the disclosure as claimed. The features of various implementing embodiments may be combined to form further embodiments of the disclosed concepts.

What is claimed is:

1. An vehicle-sensor validation system comprising:
   a coordinating processor operable for data communication with a number of vehicles;
   a sensor-fusion network comprising a plurality of sensors each in data communication with the coordinating processor and a plurality of location sensors each operable to indicate a position of one of the plurality of sensors, the sensor-fusion network comprising at least a first sensor operable to generate first data, a second sensor operable to generate second data, and a third sensor operable to generate third data,
   wherein the first sensor is associated with a first vehicle of the number of vehicles, the first data indicates a first detection status of an object, the second data indicates a second detection status of the object, the third data indicates a third detection status of the object, and wherein the coordinating processor is operable to generate coordinated data based upon the first data, second data, third data, and the relative positions of the second sensor and third sensor with respect to first sensor, the coordinated data comprising a weighted detection status of the object and generated using a majority-voting algorithm, and wherein the coordinating processor is operable to transition a sensor indicating the minority result of the majority-voting algorithm into a safe state mode.

2. The system of claim 1, wherein the second sensor is associated with the first vehicle and the third sensor is associated with a second vehicle of the number of vehicles.

3. The system of claim 1, wherein the first data comprises a first confidence value, the second data comprises a second confidence value, and the third data comprises a third confidence value, the weighted detection status being generated using the first confidence value, second confidence value, and third confidence value as weights.

4. The system of claim 1, wherein the majority-voting algorithm is a 2-out-of-3 algorithm using the first data, second data, and third data as inputs.

5. The system of claim 1, wherein the second sensor is associated with a second vehicle of the number of vehicles and the third sensor is associated with a third vehicle of the number of vehicles.

6. The system of claim 1, wherein the coordinating processor comprises a neural network operable to identify whether a potential trajectory of the first vehicle is free of obstacles.

7. The system of claim 1, wherein the coordinating processor is operable to dynamically define the sensor-fusion network as a subset of the plurality of sensors according to proximity of each of the plurality of sensors to the first vehicle.

8. The system of claim 1, wherein the coordinating processor is operable to detect a fault condition in the first sensor.

9. The system of claim 1, wherein each sensor of the plurality of sensors in the sensor-fusion network comprises a specified accuracy and the coordinating processor is operable to dynamically define the sensor-fusion network as a subset of the plurality of sensors based upon the specified accuracy of each sensor.

10. The system of claim 9, wherein coordinating processor is operable to select sensors for inclusion in sensor-fusion network based upon a minimum specified accuracy.

11. The system of claim 1, wherein the first sensor comprises a sensor type select from one of a group of sensor types including a radar sensor, lidar sensor, proximity sensor, camera sensor, infrared sensor, ultraviolet sensor, ultrasonic sensor, or sonic sensor.

12. The system of 11, wherein the second sensor comprises a different sensor type from the first sensor.

13. The system of claim 8, the fault condition comprising one of a bit flip, a software error, or an incorrect sensor scheduling of the first sensor.

* * * * *